United States Patent [19]
Mignani et al.

[11] Patent Number: 5,189,134
[45] Date of Patent: Feb. 23, 1993

[54] NONLINEARLY OPTICALLY ACTIVE POLYMERS

[75] Inventors: Gerard Mignani; Pascal Barthelemy; Remi Meyrueix, all of Lyons, France

[73] Assignee: Rhone-Poulenc Chimie, Courbevoie, France

[21] Appl. No.: 408,382

[22] Filed: Sep. 18, 1989

[30] Foreign Application Priority Data

Sep. 16, 1988 [FR] France .................. 88 12080

[51] Int. Cl.$^5$ .......................................... C08G 63/685
[52] U.S. Cl. ........................................ 528/68; 528/72; 528/75; 528/85; 528/287; 528/291; 528/292; 528/306; 528/337; 528/345; 528/347; 528/362; 528/363; 528/382; 528/403; 528/421; 526/310
[58] Field of Search .............. 528/68, 72, 75, 85, 528/287, 291, 292, 306, 337, 345, 347, 362, 363, 382, 403, 421; 526/310

[56] References Cited

U.S. PATENT DOCUMENTS

| | | | |
|---|---|---|---|
| 4,132,840 | 2/1979 | Hugl et al. | 521/167 |
| 4,757,130 | 7/1988 | De Martino | 528/292 |
| 4,922,003 | 5/1990 | De Martino | 526/312 |
| 4,985,528 | 1/1991 | Mignani et al. | 528/59 |
| 5,001,209 | 3/1991 | Wreesmann et al. | 528/70 |

*Primary Examiner*—Maurice J. Welsh
*Assistant Examiner*—Rachel Johnson
*Attorney, Agent, or Firm*—Burns, Doane, Swecker & Mathis

[57] ABSTRACT

Novel nonlinearly optically active polymers, well suited for electrooptical applications, are prepared by copolymerizing a first difunctional monomer with a second difunctional comonomer, with at least one of such difunctional monomers including a polar charge transfer moiety containing at least one electron acceptor group and at least one electron donor group (D), and further wherein the polymerizable functional groups are borne by the one or more electron donor groups (D).

10 Claims, No Drawings

NONLINEARLY OPTICALLY ACTIVE POLYMERS

CROSS-REFERENCE TO COMPANION APPLICATION

Our copending application Ser. No. 07/408,383, now U.S. Pat. No. 4,985,528, filed concurrently herewith and assigned to the assignee hereof.

BACKGROUND OF THE INVENTION

Field of the Invention

The present invention relates to novel polymers useful in the production of materials having nonlinear optical activity, e.g., electrooptical devices.

This invention more especially relates to polymers or materials having a high quadratic susceptibility ($\chi^2$) after polarization, and which may also have a good cubic susceptibility ($\chi^3$). To be nonlinearly optically active, as hereinafter more fully described, a material must have a susceptibility of a nonzero order higher than 1, and preferably a susceptibility of an even, nonzero order.

Description of the Prior Art

Numerous polymers are known to this art that possess the property of being nonlinearly optically active. In certain cases, this activity is greater than that of the inorganic materials currently used for such purpose.

Polymers used in NLO (nonlinear optics) generally contain conjugate groups with dislocated electrons, which provide them with a significant cubic $\chi^{(3)}$ susceptibility value.

Furthermore, in certain polymers (including those of the present invention), the groups responsible for the NLO activity are not centrosymmetrical and have a strong hyperpolarizability $\beta$ of the second order.

These noncentrosymmetrical groups are most typically conjugated groups with transfer of charges, the orientation of which within the materials by a polarizing electrical field renders the material noncentrosymmetrical. The material then has a nonzero quadratic susceptibility $\chi^{(2)}$.

Heretofore, these polymers were polymers with conventional backbones, such as the polyolefins, polyacrylates, polymethacrylates, polychloroacrylates or polysiloxanes, for example, onto which polar charge transfer groups were grafted.

Compare, for example, EP-262,680 and FR-2,597,109. However, these polymers have certain disadvantages and, in particular, difficulties are encountered in the preservation of their nonlinear optical activity. Indeed, the graft segments must have a certain mobility to enable their orientation in an electrical field. But they always retain a certain residual mobility, whereby over the course of time they may lose their orientation. This results in a decrease in their electronic centrosymmetry generated by the electrical field and, consequently, in their nonlinear optical activity. This phenomenon is illustrated in the article by C. Ye et al, "M.R.S. Symposium Proc.", Vol. 109 (*Nonlinear Opt. Proc. of polymers*, p 263) J. Heeger Editor, 1988.

Another disadvantage of these polymers resides in the fact that the number of polar groups displaying charge transfer is generally low, as it is a function of the structure of the polymer. Furthermore, the number of grafts cannot be very high without introducing a significant change in the properatives of the polymer.

Materials are also known to the art which possess nonlinear optical activities and typically are constituted by a polymer matrix, into which is dissolved a compound having a nonlinear optical activity of the conjugate/charge transfer molecule type.

However, these compounds generally have low solubilities in the matrix and also possess a residual mobility in such matrix, which in time will effect a disorientation of said compounds, which renders the material centrosymmetric relative to electrical charges.

In fact, the quadratic nonlinear optical activity is generated by the dislocation of the electrons and a substantial noncentrosymmetry of the charges at the molecular and material level.

SUMMARY OF THE INVENTION

Accordingly, a major object of the present invention is the provision of a novel class of polymers having good nonlinear optical activity, in particular a good quadratic activity, comprising polar charge transfer groups as a moiety in the recurring structural units of the polymer and constituting a link or bridge in the principal polymer chain. This suppresses their residual mobility, enabling production of a material that will retain its nonlinear optical activity over the course of time, and which otherwise ameliorates those disadvantages and drawbacks to date characterizing the state of this art. Further, as the polar charge transfer groups are integral moieties of the macromolecular backbone of the polymer, the number of which in the polymer chain may be quite high, and this enhances the nonlinear optical activity of the material.

Briefly, the present invention features novel nonlinearly optically active polymers prepared by polymerizing a first difunctional monomer with a second difunctional comonomer, with at least one of such difunctional monomers containing a polar charge transfer moiety. This polar charge transfer group contains at least one electron acceptor radical (A) and at least one electron donor radical (D) with the reactive functions for the polymerization being provided by the electron donor group or groups.

DETAILED DESCRIPTION OF THE PREFERRED EMBODIMENTS OF THE INVENTION

More particularly according to the present invention, in one embodiment thereof the polar charge transfer group has the following formula (I):

D-(radical with dislocated electrons)-A            (I)

in which D is an electron donor radical bearing the reactive functions for the polymerization and A is an electron acceptor radical.

Exemplary of the reactive functional groups for carrying out the polymerization, which may comprise either the first and/or second difunctional compounds, particularly representative are the alcohol, amine, isocyanate, allyl, vinyl, acid, anhydride, acid halide and epoxy functions.

Thus, exemplary polymers of the invention may be of the polyester, polyurethane, polyamide, polyvinyl, polyimide, polyamidoimide, polysulfuramide, polyether and polyesteramide type.

The first and second difunctional compounds may contain either the same or different reactive functions.

In another embodiment of the invention, the polymers of the invention may be crosslinked by the addition of polyfunctional compounds to the mixture of the difunctional compounds.

These polyfunctional comonomers are customarily used in the polymer field to produce polymers having improved mechanical properties and, in particular, a higher glass transition temperature (Tg).

In this manner, the residual mobility of the polar charge transfer groups is reduced and may even be zero.

In a preferred embodiment of the invention, the radical of formula (I) containing dislocated electrons is selected from those of the following formulae:

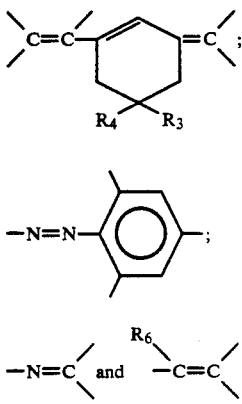

wherein $R_3$, $R_4$ and $R_6$, which may be identical or different are each a hydrogen atom or a lower alkyl radical.

Particularly suitable electron acceptor radicals (A) according to the invention are the nitro, cyano, $-CO_2R_5$ and $-PO_3(R_5)_2$ radicals, in which $R_5$ is a lower alkyl radical, preferably an ethyl or propyl radical.

The electron acceptor radicals (A) are preferably the cyano and nitro radicals and particularly the cyano/cyano and cyano/nitro combinations.

In another embodiment of the invention, the electron donor radicals (D) are radicals of the formula:

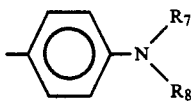

wherein $R_7$ and $R_8$ are radicals containing a reactive functional group for carrying out the polymerization.

Thus, exemplary such $R_7$ and $R_8$ radicals are the following:

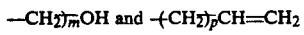

wherein m and p are integers, with p ranging from 0 to 6 and m from 1 to 6.

The other difunctional compound, if it does not contain polar charge transfer groups, may be any difunctional compound currently used for copolymerization with the functional groups borne by the difunctional comonomer containing charge transfer groups.

Thus, in the case of polyester type polymers, compounds having acid functions are exemplary, such as adipic acid, azelaic acid, sebacic acid, 2,3,4-trimethyl adipic acid, orthophthalic acid, terephthalic acid, isophthalic acid, naphthalene dicarboxylic acid, hexahydrophthalic acid, camphoric acid, and the like.

As regards the polyamides and polyimides, representative difunctional compounds include, for example, aliphatic or aromatic diamines, such as 1,3-diaminopropane, 1,4-diaminobutane, 2-methylpentaethylenediamine, metaxylilenediamine, hexamethylenediamine, 2,4-diaminotoluene, and the like.

Respecting the polyethers, ethylene oxide and propylene oxide are exemplary.

In the case of the polyurethanes, the aliphatic and aromatic polisocyanates are representative difunctional compounds, such as, for example, hexamethylene diisocyanate, and the like.

The present invention also features a material having nonlinear optical activity, containing as the active component a novel polymer as described above.

This material is produced, for example, by heating the polymer to a temperature at least equal to its glass transition temperature (Tg). The polymer heated in this manner is exposed to an electrical field to create a noncentrosymmetry of charges in the material.

The polymer thus oriented or "activated" in this fashion is then cooled and included as a component in an optically active device, such as means for electrooptical and optical treatment, such as transducers, modulators, parametric amplifiers, and the like.

In a second embodiment of the process for the preparation of the material of the invention, in the case in which the polymer is crosslinked initially a partial polymerization of the mixture of difunctional and polyfunctional compounds is carried out. The prepolymer obtained in this manner is heated to a temperature higher than its softening temperature or glass transition temperature (Tg) to provide an appropriate mobility of the groups enabling the orientation of the polar charge transfer groups by the application of an electrical field. Finally, complete polymerization is carried out by any known means.

It is thus possible to orient the polar groups at a temperature sufficiently low to prevent any degradation of the polymer followed by final crosslinking, to produce a material having a high glass transition temperature, thereby further reducing the residual mobility of the polar groups in the material.

In this manner, the nonlinear optical activity of the material is preserved to a remarkable degree upon aging.

The material may be provided in any form, such as films, fibers, molded or extruded shaped articles, etc. It may also be used to form a coating, in particular by the so-called "spin-coating" method. The forming may be carried out by any known process for the shaping of a polymerizable or polymerized material, such as, for example, forming by melting, softening, dissolution and evaporation of the solvent.

Finally, different additives may be added to the polyurethane of the invention, for example, to facilitate its forming. It may also be used in admixture with another non-linearly optically active or inactive polymer.

Specifications and explanations are given in more detail below concerning the activity of the materials in non-linear optics and the determination of such activity.

The activity of materials in nonlinear optics is determined by measuring the susceptibility of the second, third or nth order.

The susceptibilities of a material are directly related to the polarization of the material by the following fundamental relationship:

$$P = P_0 + \chi^1 \cdot E + \chi^2 E, E + \chi^3 E, E, E + \ldots$$

wherein P and Po represent polarization respectively in the presence and absence of an electromagnetic field.

E is the electrical of excitation.

$\chi^1$, $\chi^2$, $\chi^3$ represent the linear and nonlinear susceptibilities of the material.

In effect, the coefficient $\chi^1$ represents its linear optical activity.

These susceptibilities reflect the aharmonicity of the electronic potential in the material. Furthermore, the odd order susceptibilities, such as $\chi^7$ are never zero for any of the materials. In contrast, the even order susceptibilities, such as the quadratic order susceptibility $\chi^2$, are zero for centrosymmetrical materials.

It is advantageous to use materials with a nonlinear, nonzero polarization for nonlinear optical applications, such as, for example, electrooptical devices, electrooptical modulators, guides or nonguides, or for purely optical applications, such as parametric amplifiers, frequency doubling devices, etc.

To determine and measure the susceptibility coefficient $\chi^2$ of the materials, it is detected by comparison with a reference material, for example quartz, or potassium dihydrogenophosphate (KDP).

The measurement of susceptibilities is generally carried out at frequencies ($-2w, w, w$) in a harmonic doubling experiment as described in the article by S. K. Kurtz, published in *Quantum Electronics*, edited by H. Rabin and C. L. Tang, Academic Press (1975), Vol. 1, pages 209-281.

It is also possible to measure $\chi^2$ at frequencies ($-w; w, o$) in an electrooptical experiment. For this, the film is placed on a sheet of glass covered with a transparent conductive oxide ($SnO_2$). The external face of the film is covered with a semi-transparent layer of gold, with the oxide and the gold serving as the electrodes, whereby the film is polarized to render it noncentrosymmetrical. After cooling, the assembly is placed in one of the arms of a MACH ZENDER interferometer and scanned at normal incidence by a laser beam having a wavelength of 633 nm.

The film is then exposed to an alternating current of 1 KHz and 10 V.

The quadratic susceptibility $\chi_{113}^2$ ($-w; w, o$) is derived from the delay of the phase $\Delta\Phi$ caused by the voltage applied to the film, according to the following relationship:

$$\Delta\Phi = \frac{2\pi}{\lambda} \cdot L \cdot \frac{\chi_{113}^2}{n} \cdot \frac{V}{L} = \frac{\chi_{113}^2 \times 2\pi V}{n \cdot \lambda}$$

wherein:
λ is the wavelength of the laser;
n is the index of refraction of the film;
V is the electric voltage of the filed applied to the film;
L is the thickness of the film.

The second capability of susceptibility $\chi_{333}^2$ is given by the relationship:

$$\chi_{333}^2 = 3 \cdot \chi_{113}^2$$

This relationship is described in more detail in the article by K. D. Singer, published in *J. Opt. Soc. Am.*, B, Vol. 4, No. 6, pp. 968 et seq (1987).

The susceptibilities $\chi_{113}^2$ and $\chi_{333}^2$ are related to the electrooptical coefficient $r_{ijk}$ by the following relationships:

$$r_{113} = \frac{-2\chi_{113}^2}{n^4} \text{ and } r_{333} = \frac{-2\chi_{333}^2}{n^4}$$

wherein n is the index of refraction of the material.

In order to further illustrate the present invention and the advantages thereof, the following specific examples are given, it being understood that same are intended only as illustrative and in nowise limitative.

EXAMPLE 1

Preparation of the polyurethane polymer (A) comprising the following recurring structural units:

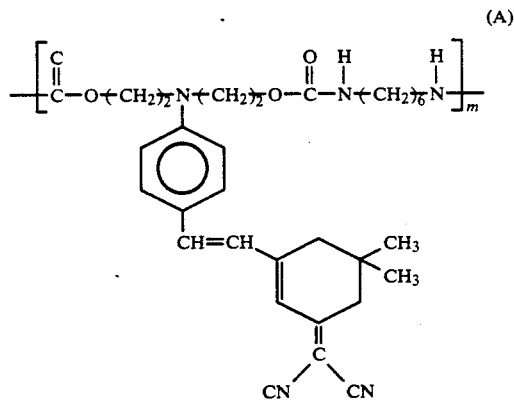

This polymer was prepared by reacting a diisocyanate, hexamethylene diisocyanate, with a compound of the following formula:

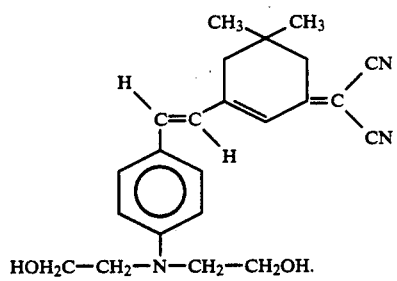

This compound was itself prepared by reacting a compound of the formula:

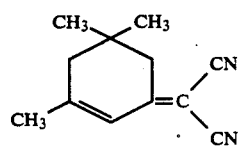

with the compound of the formula:

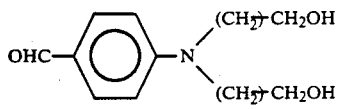

in an ethanol medium and in the presence of piperidine as the catalyst.

The product was recovered by evaporating the solvent and separating it on a silica gel column (eluant:

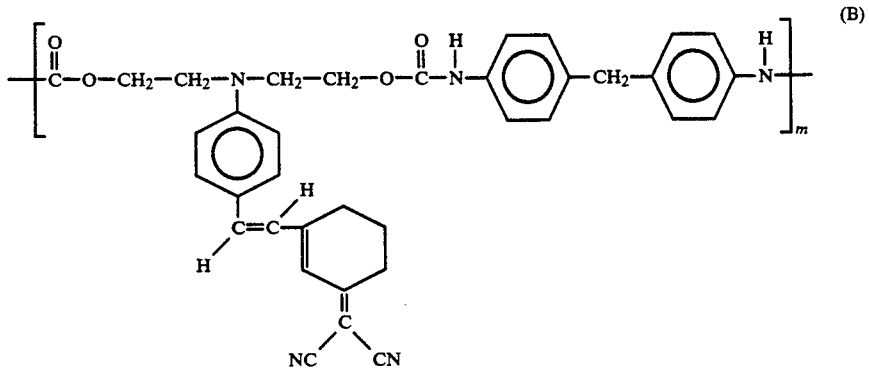

ethyl acetate) in the form of a red-violet solid having a melting point of 168° C.

This preparative process and the operating conditions of the reaction are described, in particular, in DE-2,345,189, in the article by Ralf Lemke, "Knoevenagel-Kondensationen in Dimethylformamid" (Knoevenagel Condensations in Dimethylformamide), published in *Synthesis*, 5, 359 (1974), and in the article "Solvatochromie von 80 μm in verschiedmen Alkoholen bei Arylidenisophorm-Abkömmlignen" by the same author in *Chem. Ber.*, 103, 1864 (1970).

This compound was dissolved in an anhydrous solvent (1a 1,3-dimethylimidazolidinone). The solution was then introduced into a solution of hexamethylene diisocyanate in the same solvent as above, also containing a polycondensation catalyst, such as dibutyl tin dilaurate. This process for the preparation of polymer A is conventional and is currently used for the preparation of polyurethane polymers. The reaction temperature was on the order of 105° C.

After precipitation by pouring the reaction medium into water, a red-wine dreg colored precipitate was obtained, which was recovered by filtration.

The molecular weight of the recovered polymer, determined by gel exclusion chromatography in N-methyl pyrrolidone (NMP), was 54,300 g (m was equal to about 30).

Differential thermal analysis evidenced that there was no endothermic transition corresponding to melting. The glass transition temperature, Tg, was 45° C., determined by the fiber pendulum method.

The polymer obtained was soluble in acetone, chlorinated solvents, dimethyl formamide, dimethylsulfoxide and N-methylpyrrolidone, but insoluble in water and alcohols.

UV spectrometric and NMR analyses confirmed the structure of the polymer indicated above and showed that the maximum adsorption wavelength in UV in an N-methylpyrrolidone medium was 520 nm.

The polymer, after being formed into a 3.37 μm thick film by the spin-coating method from a 10% solution in cyclohexanone, was exposed to a polarizing electrical field of 50 V/μm after heating to 100° C. for several seconds, then cooled to ambient temperature.

The determination of its electrooptical activity at a wavelength of 633 nm showed that it had a quadratic susceptibility:

$\chi_{333}^2$ (−w; w,o) equal to $130 \times 10^{-12}$ m.V$^{-1}$, or an electrooptic coefficient of $r_{333} = 50 \times 10^{-12} m.V^{-1}$.

EXAMPLE 2

Preparation of the polymer (B) comprising the following recurring structural units This polymer was produced in a manner similar to Example 1, by replacing the hexamethylene diisocyanate with diphenylmethanediisocyanate.

The product obtained, which showed no endothermic transformation in differential thermal analysis, had a glass transition temperature (Tg) of 90° C., a molecular weight of 21,000 (m was equal to about 18) and maximum adsorption wavelength of 505 nm. Its characteristics were determined by the techniques described in Example 1.

Its nonlinear optical characteristics and in particular its second order susceptibility $\chi_{333}^2$ were determined by the procedures described in Example 1. However, the orientation of the groups was carried out at a temperature of 120° C. for several minutes.

The determination of its electrooptical activity at a laser wavelength of 633 nm showed that $\chi_{333}^2$ (−w,w,o) was equal to $95 \times 10^{-12} mV^{-1}$.

EXAMPLE 3

Preparation of a crosslinked polymer

To prepare this polymer:

1. A prepolymer was first synthesized as described in Example 1, by using an excess of diol relative to the diisocyanate. This excess amounted to 4 mole %.

The prepolymer obtained in this manner was principally chain-terminated by hydroxyl groups.

It had a glass transition temperature of 49° C.

2. The prepolymer was dissolved in cyclohexanone at concentration of 15%. The catalyst (dibutyl tin dilaurate) and a slight excess, relative to the hydroxyl groups, of HDI trimer of the following formula, were added:

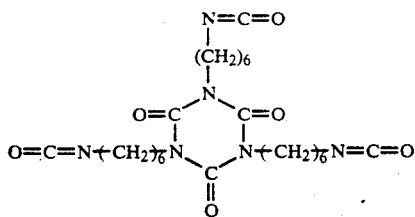

The prepolymer was applied in the form of 3.2 μm thick film to a heated support from a 10% solution in cyclohexane, then exposed to a polarizing field of 50 V/μm at a temperature of 50° C. for 10 min. The temperature was then increased to 120° C. to effect complete crosslinking, then cooled to ambient temperature.

In this manner, a material having a glass transition temperature of 80° C. and an electrooptical susceptibility $\chi^2$ (−w,w,o) of $80 \times 10^{-12} mV^{-1}$ at 633 nm was obtained.

EXAMPLE 4

Preparation of the polyester (C) comprising the following recurring structural units

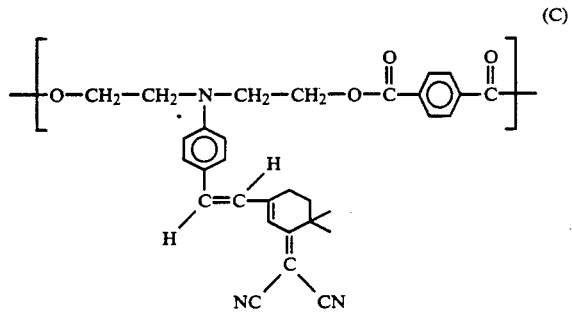
(C)

This polymer was prepared by reacting an acid chloride of the formula:

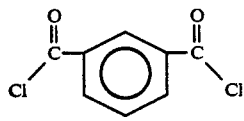

with a compound of the following formula:

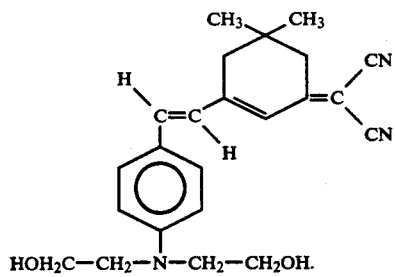

This reaction was carried out in the presence of 1,3-dimethyl-2-imidazolidinone as the solvent and triethylamine, at a temperature on the order of 90° C.

The reaction mixture was introduced, after cooling, into water. The precipitate obtained, deep red in color, was washed with water and dried in a vacuum at 60° C.

UV and NMR analyses confirmed the structure of the polymer and showed that the maximum absorption wavelength in UV in an N-methylpyrrolidone medium was equal to 512 nm. Furthermore, the molecular weights $\overline{M}w$ and $\overline{M}n$ of the polymer respectively were equal to 6,770 and 4,800.

The differential thermal analysis of the polymer showed that it had a glass transition temperature (Tg) of 142° C.

The determination of its electrooptic activity at a wavelength of 633 mn showed that $\chi_{3.3.3}^2$ (−w;w,o) was equal to $95 \times 10^{-12} mV^{-1}$.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A nonlinearly optically active polymer, which comprises the copolymerizate of a first difunctional monomer with a second difunctional comonomer, with at least one of said difunctional monomers comprising a polar charge transfer moiety having the following formula (I):

D-(radical with disclosed electrons)-A  (I)

in which A is an electron acceptor radical comprising a nitro, cyano, —CO₂R₅ or PO₃(R₅)₂ radical, wherein R₅ is a lower alkyl radical; D is an electron donor radical, wherein the electron donor radical provides the reactive functions for the polymerizable functional groups, the polymerizable functional groups attached to said electron donor and said other difunctional monomer have alcohol, amine, allyl, vinyl or acid functions; and said radical with dislocated electrons have one of the formulae:

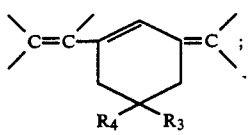

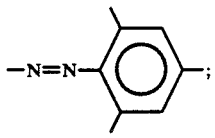

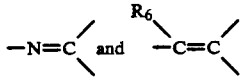

in which R₃, R₄ and R₆, which may be identical or different, are each a hydrogen atom or a lower alkyl radical.

2. The polymer as defined by claim 1, said first functional monomer bearing the same polymerizable functional groups as said second functional monomer.

3. The polymer as defined by claim 1, said first difunctional monomer bearing different polymerizable functional groups than said second difunctional monomer.

4. The polymer as defined by claim 1, in crosslinked state.

5. The polymer as defined by claim 1, said electron donor radicals (D) having the formula:

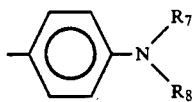

in which $R_7$ and $R_8$, which may be identical or different, are each a radical containing a polymerizable functional group.

6. The polymer as defined by claim 5, wherein $R_7$ and $R_8$ are each a $-(CH_2)_m-OH$ or $-(CH_2)_p-CH=CH_2$ radical, in which m and p are integers, with m ranging from 1 to 6 and p ranging from 0 to 6.

7. A nonlinearly optically active material comprising the polymer as defined by claim 1.

8. The nonlinearly optically active material as defined by claim 7, comprising a fiber, film or molded shaped article.

9. The nonlinearly optically active material as defined by claim 7, comprising an optoelectrical device.

10. The nonlinearly optically active polymer of claim 1, wherein the polymer is heated to a temperature at least equal to its glass transition temperature and exposed to an electrical field.

* * * * *